March 6, 1973 M. NIKLARZ Re. 27,590

CONTROL DEVICE FOR INITIATING THE INJECTING PROCESS OF INJECTION MOLDING MACHINES

Original Filed July 3, 1968 2 Sheets-Sheet 1

INVENTOR.

MANFRED NIKLARZ

BY Bair, Freeman & Molinare Attys.

INVENTOR.
MANFRED NIKLARZ

BY Bair, Freeman & Molinare Attys.

United States Patent Office

Re. 27,590
Reissued Mar. 6, 1973

27,590

CONTROL DEVICE FOR INITIATING THE INJECTING PROCESS OF INJECTION MOLDING MACHINES

Manfred Niklarz, Rintein, Germany, assignor to Stubbe Maschinenfabrik G.m.b.H., Kalletal-Kalldorf, near Vlotho, Germany Original No. 3,566,445, dated Mar. 2, 1971, Ser. No. 742,352, July 3, 1968. Application for reissue July 27, 1971, Ser. No. 166,647
Claims priority, application Germany, July 5, 1967, P 15 83 702.2
Int. Cl. B28b *17/00*
U.S. Cl. 425—149 4 Claims

Matter enclosed in heavy brackets [ ] appears in the original patent but forms no part of this reissue specification; matter printed in italics indicates the additions made by reissue.

ABSTRACT OF THE DISCLOSURE

A control device for initiating the injection step of an injection molding machine cycle, wherein the injection nozzle and the mold are moved toward and pressed against each other by means of a feed unit.

BACKGROUND OF THE INVENTION

On injection molding machines it is necessary that the injection step should not commence until the nozzle has been applied in fluid-tight manner to the reception opening or feed bushing of the mold. If such injection molding machines operate automatically, then it is necessary to provide an apparatus which will enable this requirement to be satisfied. This applies in particular to rotary automatic machines having a plurality of molds arranged on a circular table and the feed bushings of which may exhibit varying spacing from the inoperative position of the nozzle. However, an arrangement of this kind is advantageous also for machines having only one mold.

It is already known to automatically initiate the injection process by means of a limit switch (also when using a multiplicity of different molds), when the injection nozzle is positioned against the feed bushings of the molds. These limit switches are actuated due to the movement of the nozzle toward the injection mold and they contain an interposed time relay which triggers the injection step only after expiration of a predetermined time period which is so selected that the nozzle has certainly traveled sufficiently to contact the feed bushing even after passing through the longest possible travel distance.

In an arrangement of this kind it is disadvantageous that the time relay must, if a multiplicity of molds is used, be adjusted in every case to the longest possible nozzle travel and that then the commencement of injection depends, also in the case of shorter nozzle travel paths, on the maximum nozzle travel effected. In this way, the dead time of the machine is increased, i.e., the machine efficiency is impaired. Thus, an injection molding machine of this kind is no longer able to operate with maximum economy and furthermore the expenditure for installation is relatively high.

A further known means of solving the problem consists in programming the nozzle travel effected for each of the molds used and triggering the injection process in accordance with this program. It is true that by these means the dead time is diminished but the expenditure for mechanical and electrical control elements is extremely high and furthermore new programming is required with every change of molds.

BRIEF SUMMARY OF THE INVENTION

My invention is intended to obviate the disadvantages of the known control devices, i.e., the result achieved consists of the injection molding machine operating extremely reliably and safely with the shortest possible idle time, and requires for that purpose only extremely low expenditure.

This object is achieved in my invention by an arrangement whereby the control device is designed to be triggered by the pressure increase building up in the feed unit after the application of the nozzle against the mold.

The proposal of the invention exploits in a logical manner the realization that the feed unit must, when the injection nozzle is moved towards the mold overcome substantially only the bearing friction and therefore a noteworthy pressure increase takes place only at that instant at which the injection nozzle bears against the feed bushing of the mold and in this way encounters a considerably larger resistance. By appropriate exploitation of this pressure increase, I assure that the injection step takes place independently of the nozzle travel which has been effected, always at that instant at which the injection nozzle bears firmly against the mold.

Further details and advantages of the present invention will be discussed in greater detail hereinbelow, with reference to examples of embodiments and with reference to the drawings, wherein:

DESCRIPTION OF THE PREFERRED EMBODIMENTS

Figure 1:
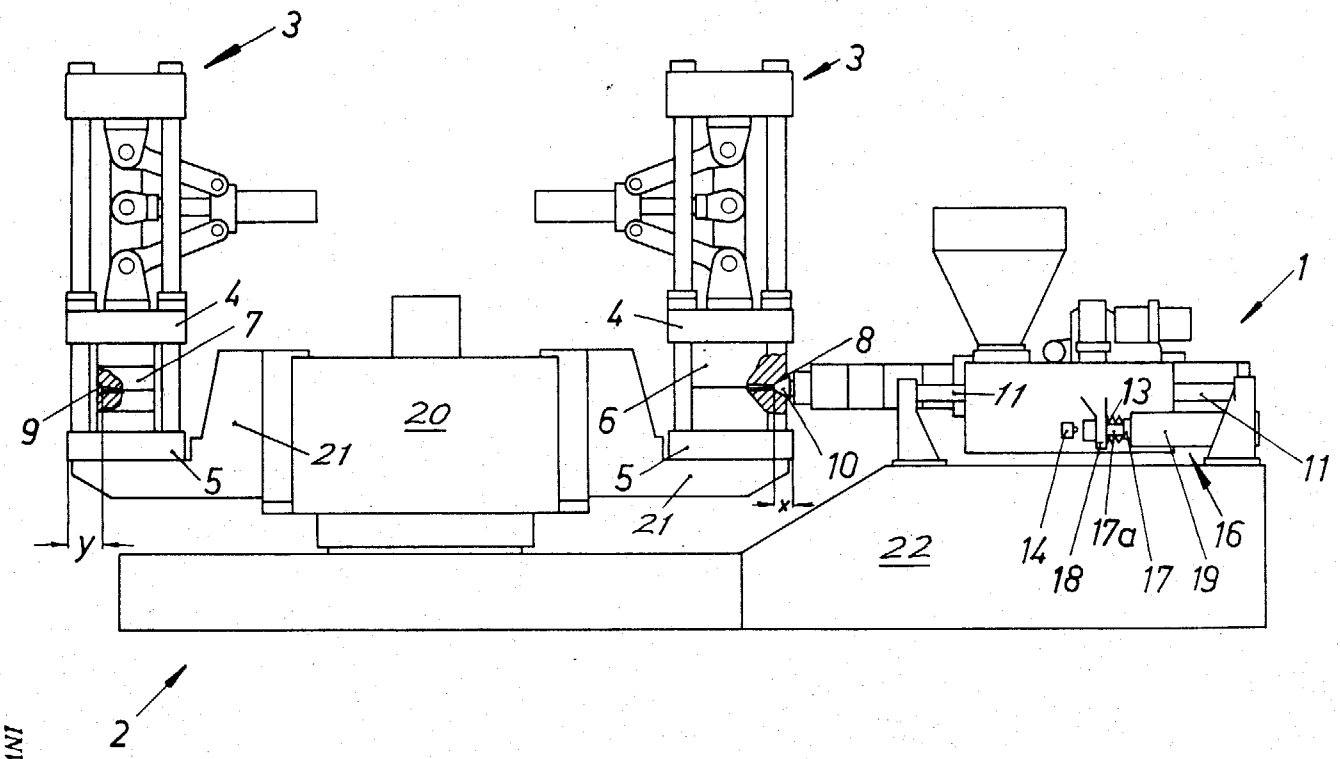
FIG. 1 is an elevation of an injection molding machine according to my invention, when employed as an automatic rotary machine.

The injection molding machine shown in FIG. 1 is an automatic rotary machine having a multiplicity of molds. It consists of an injection molding unit 1 and a table base 2 on which is rotatably mounted a circular table 20 having a multiplicity of brackets 21 which support mold-carrying unit 3 (only two are shown, for reasons of clarity). Such mold-carrying units are provided with closure plates 4 and 5 clamped between each of which is a mold 6 or 7. By timed rotation of the circular table 20, the mold-carrying units 3 may be displaced one after the other into position aligned with the injection unit 1, so that the molds may be employed successively for the injection process.

The injection unit 1 carries a nozzle 10 at its forward end and it is so mounted as a unit for longitudinal displacement on a pair of guide bearers 11 that it is able to effect movements in the direction toward the molds or away therefrom. These movements are produced by two hydraulic feed units 16, the cylinders 19 of which are stationary on a main base 22 of the machine and the piston rods 17 of which extend through brackets 18 extending from the injecting unit 1. Only one of these feed units 16 is shown in FIG. 1, the other one being located on the far side of the injection molding machine.

The molds 6 and 7 each have a feed bushing 8 or 9 against which, before the commencement of the injection step (i.e., after the advance of the injection unit 1 has been concluded), the nozzle 10 bears firmly. The feed bushing may, depending on the design of the clamped mold, be set back relatively to the outer edge of its associated closure plate through distances involving varying spacing. In the example illustrated, the spacing beween the feed bushing 8 and the outer edge of the associated closure plate 5 has the dimension x in the case of nold 6 and the (larger) dimension y in the case of mold '. Due to the differences in these dimensions, varying values are obtained in respect of the feed paths along which he injection unit 1 is required to travel from its inoperative position as far as the position wherein the nozzle 10 ›ears against feed bushings and corresponding also for he feed times necessary for that purpose.

The injection step is initiated by means of a control ›r switching means 14 (such as a limit switch) which, ndependently of the advance travel paths of the injecting ınit 1, is in every case actuated directly after application ›f the nozzle 10 against the feed bushings of the molds, his being done in response to considerable pressure increase building up in the feed units 16 after the application of the nozzle against the feed bushing. In the example illustrated, this is accompanied by actuation of the control means 14 by the piston rod 17 of the feed unit 16, the piston rod being so attached to the bracket 18 rom the injection unit 1 that it engages it practically "rigidly" during the advance movement of the injection ınit but, after the feed has been concluded, due to the ›ressure increase in the feed unit, is able to carry out a urther movement relative to the bracket 18, such movenent being adequate for actuation of the switching means 14. The switching means is shown diagrammatically in FIG. 2 in circuit with an "Initiating Device for the Inecting Process."

Figure 2:
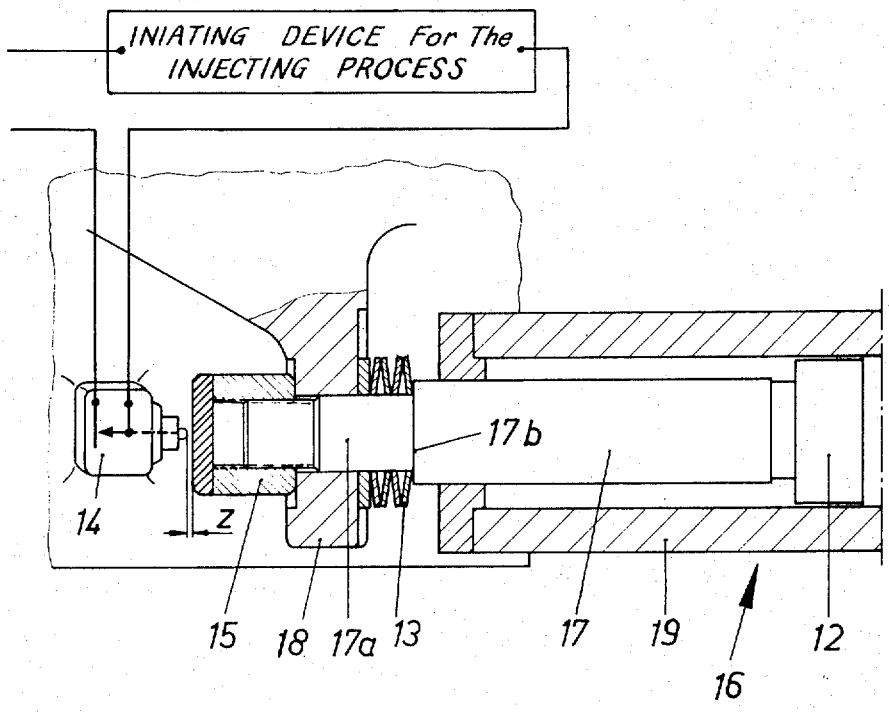
FIG. 2 shows, on a larger scale, one control device used in the machine according to FIG. 1, the illustration being partly in section.

As can be seen in detail in FIG. 2, the piston rod 17 of he feed unit 16 is provided with a stepped end 17a slidngly guided in the bracket 18 of the injection unit. On he side of the bracket 18, which faces the feed unit beween the bracket and a shoulder 17b formed at the point ›f transition of the elements 17 and 17a on the piston ›od, one or more disc springs 13 are arranged, whereas ›n the other side of the bracket 18 a cap nut 15 is ›crewed on to the piston rod end 17a. The switching neans 14 is arranged with a spacing z (obtaining in the noperative position of the feed unit 16) from the effective ›nd of the piston rod, i.e., the cap nut which is an axial ›rolongation of the piston rod 17.

If, during a working cycle of the injection molding machine, the feed unit 16 begins to push the injecting unit l forwardly out of the inoperative position towards the nold 6 or 7, it requires first of all to overcome only the 'orce necessary for moving the injection molding unit 1 (including the bearing friction on the guide bearers 11). This force is relatively small and the conditions are simiar in the pressure chamber of the cylinder 19 before the 'eed piston 12, on which a relatively small pressure p1 ıcts. However, as soon as the nozzle 10 bears firmly ıgainst the feed bushing of the associated mold, a conıiderably larger resistance is opposed to the movement of he injection molding unit. The result of this is that a ›ery considerable pressure increase builds up in the presıure chamber of the cylinder 19, i.e., the piston 12 of the 'eed unit is now acted upon by a considerably higher ›ressure p2. The springs 13 and the spacing z are, in this ›onnection, so selected that, at the low pressure p1 during he movement of the injection molding unit 1, the piston ›od end 17a is not displaced in the bracket 18 and is herefore not able to reach the switching means 14. The ›ery much higher pressure p2 after application of the ıozzle 10 against the feed bushing 8 or 9 of the mold is, ıowever, adequate to displace the piston rod end 17a ıgainst the spring pressure of the springs 13, through the ıpacing z and on to the switching means 14 and in this ›ay to trip the switching means for initiation of the inection molding process.

In order to ensure that the switching means 14 may not ›e actuated by the frictional force set up during the ad›ance movement of the injection molding unit, which 'rictional force opposes the spring tension of the springs 13, the minimum pressure necessary for actuating the switching means is expediently adjustable. This is achieved in a simple manner, by the arrangement whereby the cap nut 15 is screwed more firmly on the piston rod end 17a or is further screwed off from it. In this way, the bias of the springs 13 is varied, whereas the spacing z between the cap nut 15 and the switching means 14 remains constant. If, in this manner, the bias of the springs 13 is increased, then it is necessary to apply a higher pressure in order to enable the piston rod 17 with the cap nut 15 to travel through spacing z and in this way to actuate the switching means 14.

The adjustment of the minimum pressure necessary for actuating the switching means may, however, also be differently effected in the case of the example illustrated. It is equally possible, without changing the bias of the springs 13 and even without imparting any bias thereto at all, to vary the spacing z between the switching means 14 and the cap nut 15 serving as a stop or abutment. If this spacing is for example enlarged, then in this way the spring travel through which the springs require to be compressed is simultaneously enlarged, in order that the stop or outer end of the cap nut may reach the limit switch 14. If, however, the spring travel is enlarged, then simultaneously the force opposed by the springs to the movement of the piston rod in the bracket 18, until the springs or an abutment provided thereon reach the switching means, is enlarged. The variation in the spacing z may be achieved either by displaceable arrangement of the switch 14 or by a stop which is variably adjustable on the piston rod and by means of which the switching means 14 is actuated.

A solution of this kind is achieved for example by means of the arrangement whereby, instead of the cap nut shown, a shorter cap nut is used which is adapted to be freely rotated on the end of the piston rod, whereas a second nut is screwed to such an extent on to the piston rod that it bears against the bracket 18 and in this way determines the end position of the piston rod in the inoperative position of the feed unit. If, at the same time, the cap nut is rotated, then, in practice, the piston rod is shortened or lengthened and the spacing z thereby varied. The bias of the springs (determined by the nut bearing against the bracket 18) does not in this case require to be varied. Instead, the nut must merely be tightened to such an extent that the piston rod holds (by means of its shoulder 17b) the springs firmly against the bracket 18 in order that, on the commencement of movement of the piston rod, this movement may from the very outset take place against the force of the springs.

Due to the adjustability of the minimum pressure necessary for actuation of the switching means 14, it becomes possible not only to ensure that the injecting process is not tripped during the advance movement of the injecting unit but furthermore also to avoid any possibility of the injection process commencing when the nozzle, although it has already reached the feed bushing of the mold, is not yet bearing under the necessary application pressure against the bushing. Since the injection step is, practically speaking, controlled by this application pressure, it is merely necessary for this purpose to adjust for an adequately large minimum pressure in the control or switching device 14.

The invention is not limited to the example illustrated in the drawings and it is capable of variation within a wide framework. The only important factor is that the switching or control device for initiating the injection step should be controlled in response to the pressure increase building up in the feed unit on application of the nozzle against the feed bushing. For this purpose, it is also possible to interpose a spring member at some other position between the feed unit and the nozzle so that, on compression of the spring member beyond a predetermined limit, a switch is actuated. The most expedient position for a spring member of this kind will depend on the type of injection molding machine available in every specific case.

Figure 3:
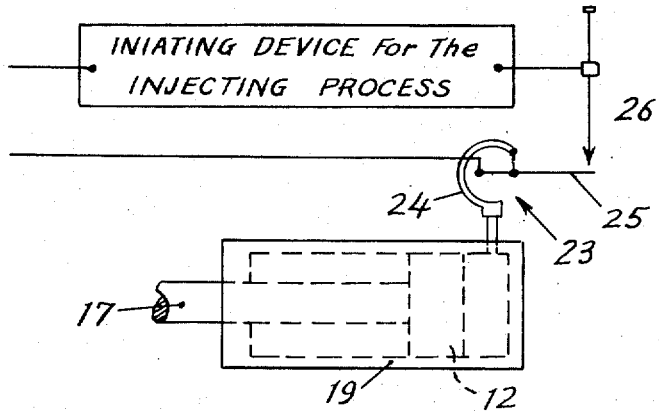
FIG. 3 is a diagrammatic view of a modified form of the invention.

When using a hydraulic feed unit as shown in the illustrated example, the switching means by means of which the injection step is triggered may alternatively consist also of a pressure switch 23 shown in FIG. 3 connected with the pressure chamber of the hydraulic cylinder 19 behind the piston 12 therein. The pressure switch 23 is then actuated when a predetermined minimum pressure in the hydraulic cylinder is exceeded. A form of embodiment of this kind will be used for example if the pressure chamber of the hydraulic cylinder into which hydraulic liquid is introduced during the forward movement of the injection nozzle is arranged to be in connection with a contact pressure gauge adjusted to a predetermined pressure, a Bourdon tube 24, pivoted switch arm 25 and adjustable contact 26 being shown in FIG. 3 by way of example. In this way, after the application of the nozzle against the tool, in direct response to the pressure increase in the pressure chamber of the feed unit, the electrical contact 26 is closed so as to initiate the injection step.

I claim as my invention:

1. A control device for initiating the injection step in injection molding machines, wherein an injection nozzle and a mold are moved towards and pressed against each other by means of a feed unit, characterized in that the control device is adapted to be tripped by means of the pressure increase building up in the feed unit after the application of the nozzle against the mold; and further characterized in that said control device is a switching means which can be triggered, and there is interposed between the feed unit and the nozzle a spring member, compression thereof beyond a predetermined limit effecting triggering of said switching means.

2. A control device according to claim 1, wherein the injection unit is, with the injection nozzle, displaced as a uniform structural group by a hydraulic feed unit along guide means toward the injection mold, characterized in that a piston rod of the feed unit is slidingly guided in a bracket on the injection unit and is supported thereagainst by said spring member, said switching means being fixed in relation to the injection unit with spacing from an abutment end of the piston rod and in such manner that, when the piston rod slides through said bracket, the abutment end triggers said switching means aaginst the force of said spring member.

3. A control device according to claim 2, characterized in that the position of said abutment end on said piston rod is adjustable and thereby the spacing obtaining, in the inoperative position, between said abutment end and said switching means is variable.

4. A control device according to claim 2, characterized in that, whilst maintaining constant the spacing obtaining in the inoperative condition between said abutment end and said switching means, the bias of said spring member is variably adjustable.

References Cited

The following references, cited by the Examiner, are of record in the patented file of this patent or the original patent.

UNITED STATES PATENTS

| | | | |
|---|---|---|---|
| 2,381,125 | 8/1945 | Hermann | 425—150 |
| 2,410,909 | 11/1946 | Tucker | 425—146 |
| 2,561,169 | 7/1951 | Bickelhaupt | 425—149 |
| 2,790,204 | 4/1957 | Edwards et al. | 425—137 |
| 2,671,247 | 3/1954 | Lester | 425—149 |
| 3,526,687 | 9/1970 | Valyi | 425—146 |

H. A. KILBY, Jr., Primary Examiner

U.S. Cl. X.R.

425—242